Feb. 16, 1965 G. NAMY 3,170,017
CONVERTER-GAS PROCESSING SYSTEM
Filed April 18, 1960 9 Sheets-Sheet 1

Inventor:
Gerald Namy
BY Baldwin & Wight
Attorneys

Feb. 16, 1965   G. NAMY   3,170,017
CONVERTER-GAS PROCESSING SYSTEM
Filed April 18, 1960   9 Sheets-Sheet 2
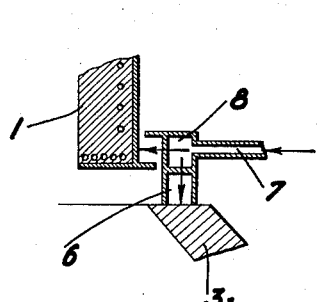
Fig.2
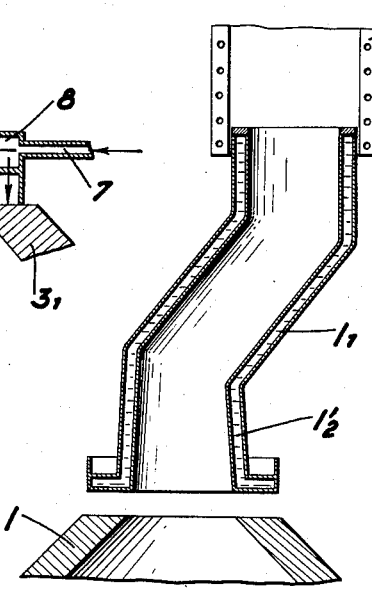
Fig.3
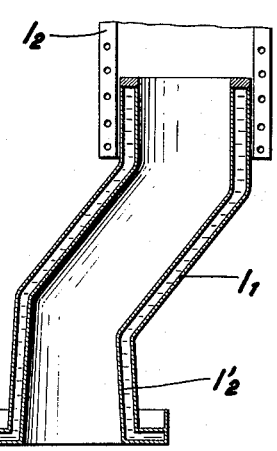
Fig.4
Fig.5
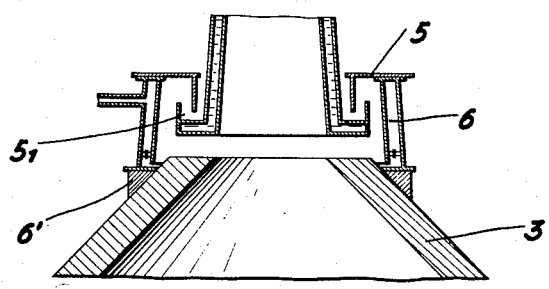
Inventor:
Gerald Namy
BY Baldwin & Wight
Attorneys Feb. 16, 1965           G. NAMY           3,170,017
CONVERTER-GAS PROCESSING SYSTEM
Filed April 18, 1960           9 Sheets-Sheet 3

Inventor:
Gerald Namy
BY Baldwin & Wight
Attorneys

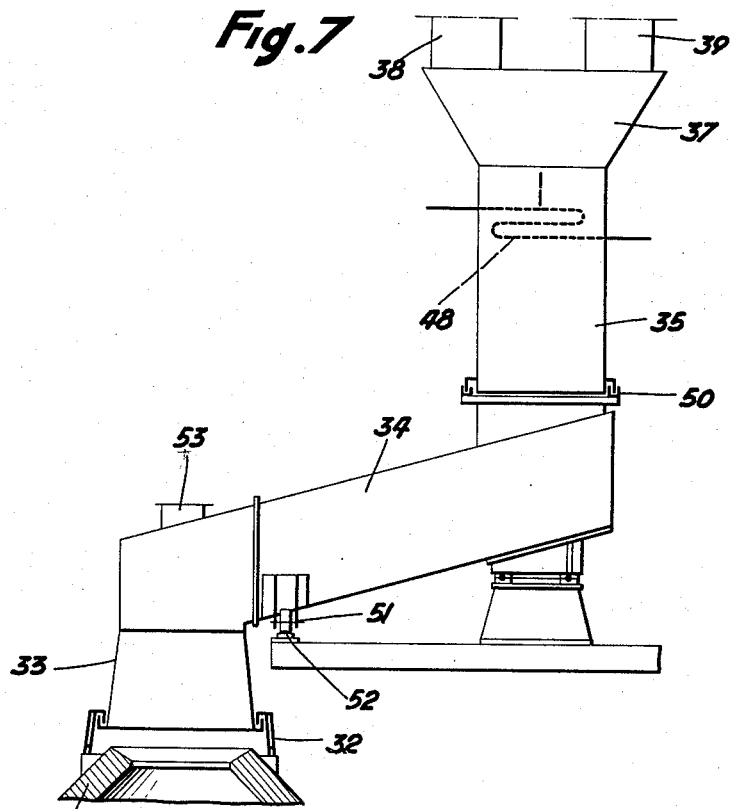
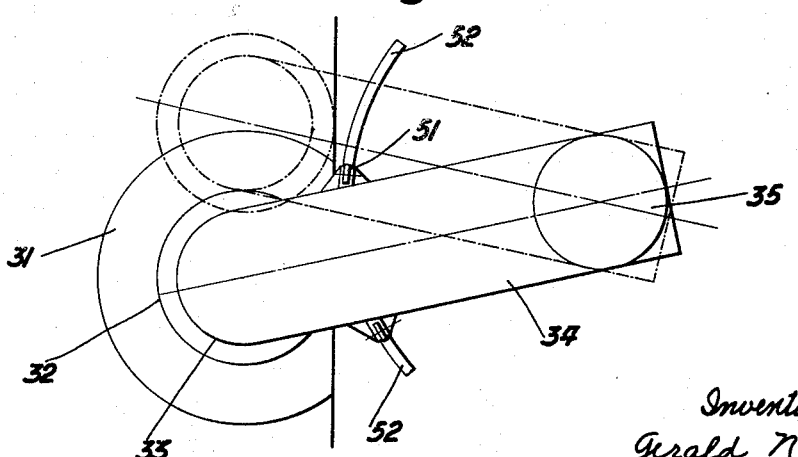

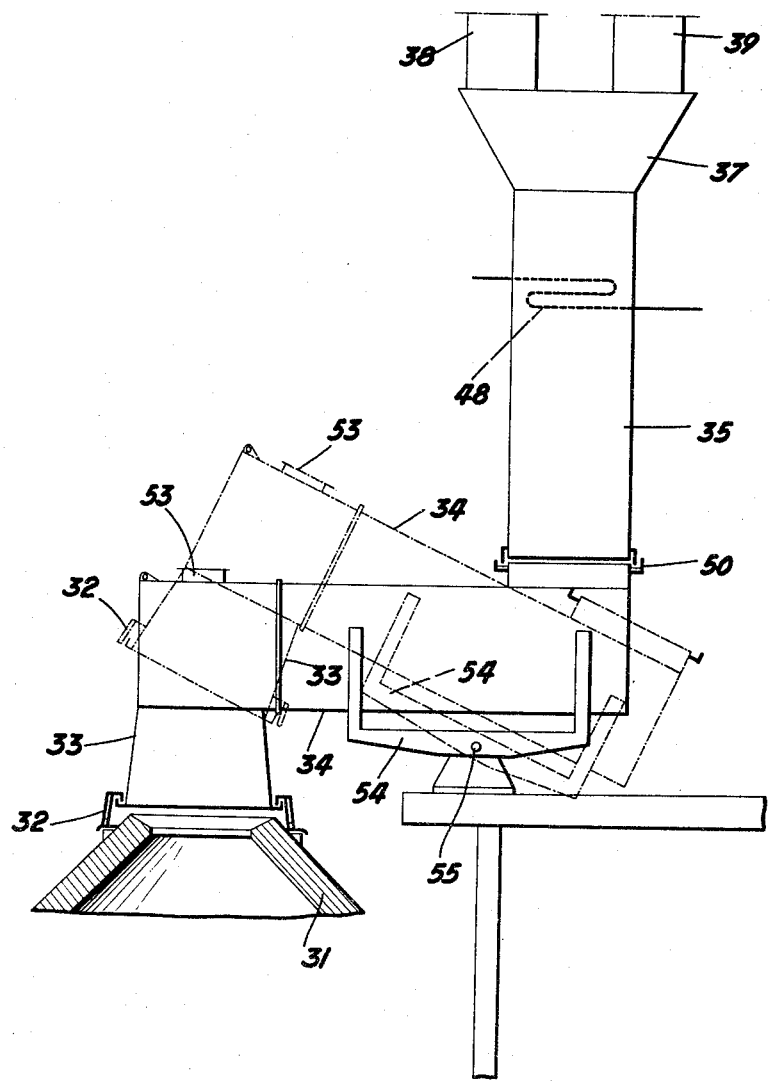

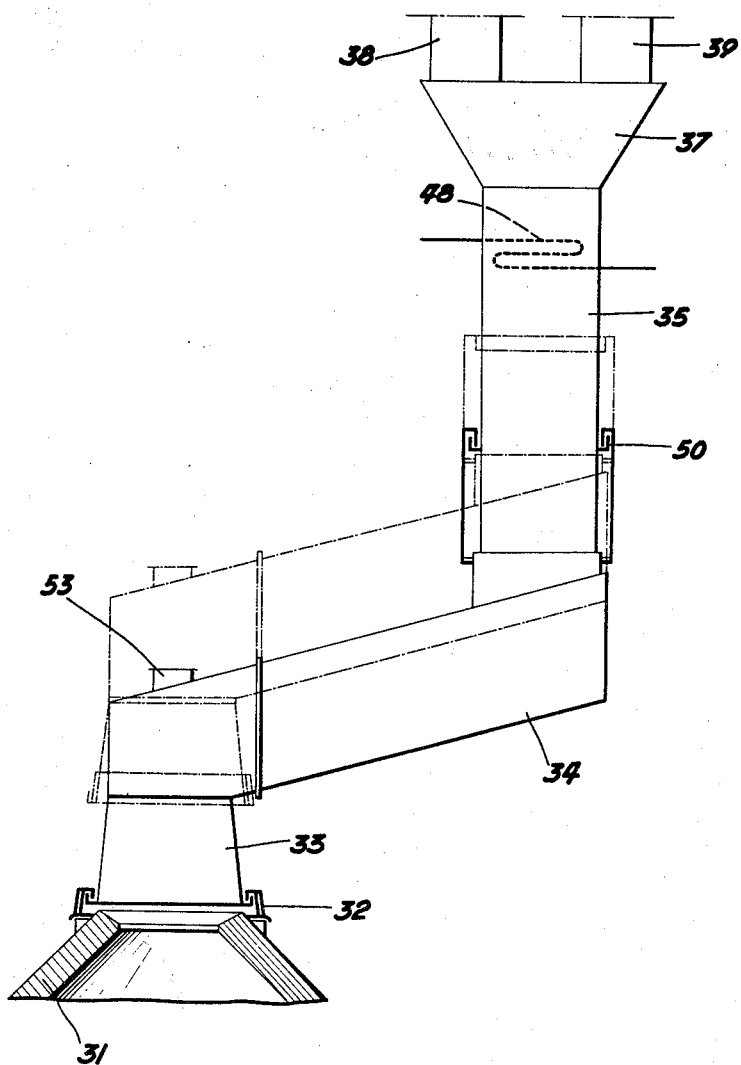

United States Patent Office 3,170,017
Patented Feb. 16, 1965

3,170,017
CONVERTER-GAS PROCESSING SYSTEM
Gerald Namy, Saint-Etienne, France, assignor to Compagnie des Ateliers et Forges de la Loire St.-Chamond-Firminy-St.-Etienne-Jacob Holtzer, Paris, France, a corporation of France
Filed Apr. 18, 1960, Ser. No. 22,855
Claims priority, application France, Apr. 21, 1959, 792,667
16 Claims. (Cl. 266—35)

This invention relates to systems for processing the exhaust gases from oxygen-blast converters in steel-making plants and especially to systems for handling such exhaust gases for the recovery of the latent and sensible heat energy content in them.

In oxygen-blast converter installations, the cleaning of the converter exhaust gases before discharge thereof to the atmosphere is of especial importance because the free oxygen content in the gases imparts an objectionably high degree of coloration to the dirt particles suspended therein. Moreover, the residual energy content of the exhaust gases is high and it is very desirable to recover the highest possible fraction of it. The available energy content is approximately of the same order as the energy required for producing the blast oxygen used.

In certain types of converter exhaust gas processing systems heretofore proposed, the gases were burned in a low-pressure steam boiler placed above the converter. In such a method however the combustion gases have to be diluted after combustion of the carbon monoxide contained in them, so that the volumetric amount of gas to be treated greatly exceeds, by a factor of six or more, that of the gases actually discharged from the converter. This greatly increases the size of the plant and the corresponding initial financial outlay. Moreover, the large volume of combustion gases to be handled necessitates expenditure of considerable amounts of power for draft. Also, substantial amounts of heat energy must be accumulated and maintained for supplying the necessary power to the steam consuming equipment during periods where the converter plant is idle.

The de-dusting operation has to be effected thoroughly so as to bring down the dust content in the flue gases to less than about 50 mg. per cubic meter if the discharged smoke is to be tolerably free of visible particles in accordance with public health regulations.

In order to reduce the volume of gas to be treated, it has been proposed to collect the converter exhaust gas from the outlet of the converter in a movable hood engaging the converter snout by way of a seal of the steam-pressure type to which steam is supplied from the low-pressure boiler fuelled by the gases. Steam from the boiler is also injected into the hood to facilitate the discharge of the gases and simultaneously humidify them thereby facilitating subsequent scrubbing. In other installations of the same general character, water spray is used to cool the gases energetically after discharge through a sealed stationary hood. While these systems do have the advantage that they reduce the volume of gas to be handled to the volume of gases actually issuing from the converter, and to a certain extent avert the combustion of carbon monoxide to dioxide, they remain expensive to construct and operate and have been far from successful.

It is an object of the present invention to provide an improved system for recovering the heat content of converter exhaust gases; another object is to permit storage of the combustible gases, in connection with this object, to raise the tolerable residual dust content in the gases so that cleaning and scrubbing operations are greatly facilitated.

According to an aspect of the invention, a system for processing converter exhaust gases comprises a hood extending from the top outlet of the converter so as to collect the exhaust gases passing therefrom, water-tube boiler means associated with said hood in heat-exchange relation with the gas flow therethrough for producing steam while simultaneously cooling said gas, means for cleaning and further cooling the gas flow from said hood, and storage means for storing the cool gas for subsequent use.

The water tubes associated with the hood are connected in a flow circuit including a spherical collector tank in which the generated steam collects and from which the steam is tapped for use at selected points of the system.

In a modification, the water may circulate under substantial pressure through the tubes in a closed circuit including a heat exchanger associated with a water and steam collector tank.

In a further aspect of the invention, the hood is constructed in a plurality of sections, including an upstream or lower section engaging the top of the converter, an intermediate section, and a downstream or upper section. The latter is connected through valve gating, selectively with the de-dusting and storage facilities or with an exhaust stack. In this modification of the invention, steam is produced from water flowing through jackets associated with the lower and upper hood sections, and from water flowing through tubing associated with the intermediate section; the outlets and inlets from and into the water jackets are connected in respective flow circuits each containing a related steam collector or tank and the steam from the tops of these tanks is vented to atmosphere; while the outlet and inlet from and into the tubing associated with the mid-section of the hood are connected in a third circuit including a third tank or collector, and the pressure steam separated from the top of this latter is discharged through a superheater mounted in the upper hood section utilizing the sensible heat in the exhaust gases; all three steam collectors are connected in a cascade or series arrangement for the supply of make-up water thereto, so that such supply is effected first through the water jacket associated with the lower hood section, then partially through the jacket associated with the upper hood section and lastly through the collector associated with the intermediate hood section.

The lower hood section is preferably displaceably connected with the snout of the converter. Such connection may be adapted for a telescopic, a rotary, or a rocking displacement of the hood section with respect to the converter. Improved movable seal arrangements are provided according to the invention for permitting relative displacements of the hood section into and out of engagement with the converter.

The cleaning or scrubbing of the exhaust gases is effected in a reducing or slightly oxidizing medium and steam is preferably injected for improving the scrubbing operation. Injection of steam and/or water spray may be effected at other selected points of the system, including especially the hood, upstream from the recovery collector, and/or the gas discharge conduit beyond the valving serving to isolate the various sections of the gas circuit of the system. The said injections are made at points where the gas temperature may vary within a range of about from 300 to 1000° C. The total amount of steam injected into the gas circuit may be in a range of from 40 kilograms to 1000 kilograms per metric ton of iron treated in a conversion process.

The system, as will appear, provides extremely convenient means for deriving accurate measurements of the flow rate and composition of the converter exhaust gases and such data are desirably used in monitoring the iron converting process.

The above and further objects, features and aspects of the invention will appear as the description proceeds, wherein embodiments of the invention are disclosed for purposes of illustration but not of limitation with reference to the accompanying drawings, wherein:

FIG. 2 is a large-scale view of one form of seal between the hood and converter according to the invention;

FIGS. 3 and 4 are views in sectional elevation showing a modified embodiment of the head;

FIG. 5 is a fragmentary vertical sectional view of the upper part of a converter and associated hood and sealing device;

FIGS. 7 and 8 are respectively an elevation and a plan of an arrangement in which the hood is rotatable about a vertical axis;

FIG. 9 is an elevational view of a modification in which the hood is rockable about an horizontal axis;

FIGS. 10 shows a hood displaceable vertically;

Figure 12:
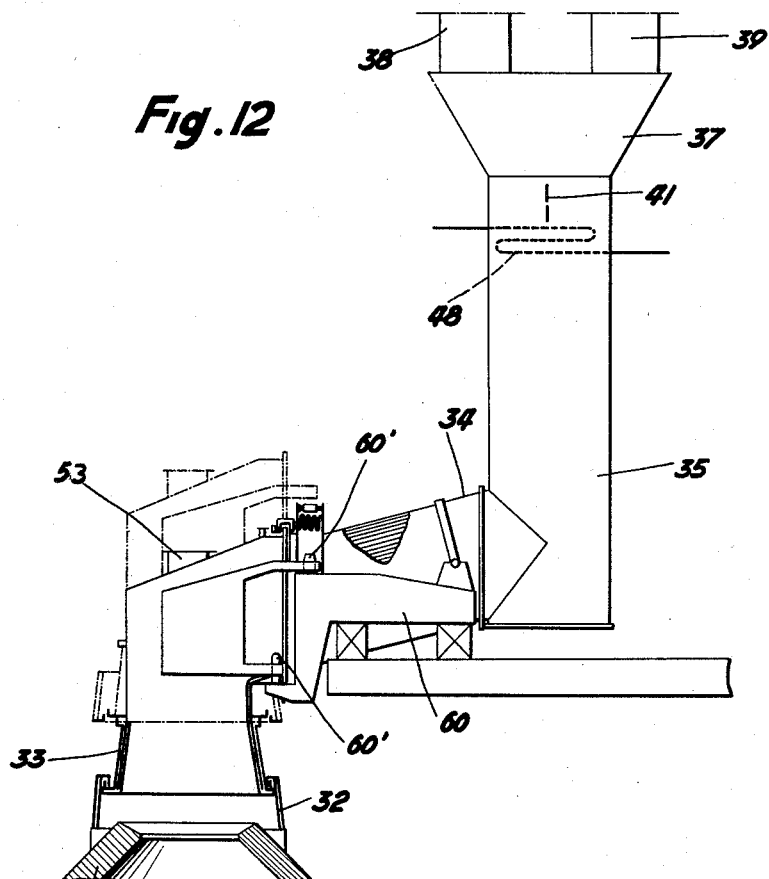
Figure 11:
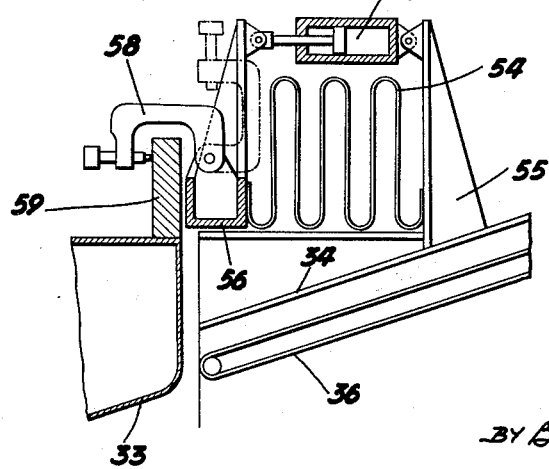
Figure 13:
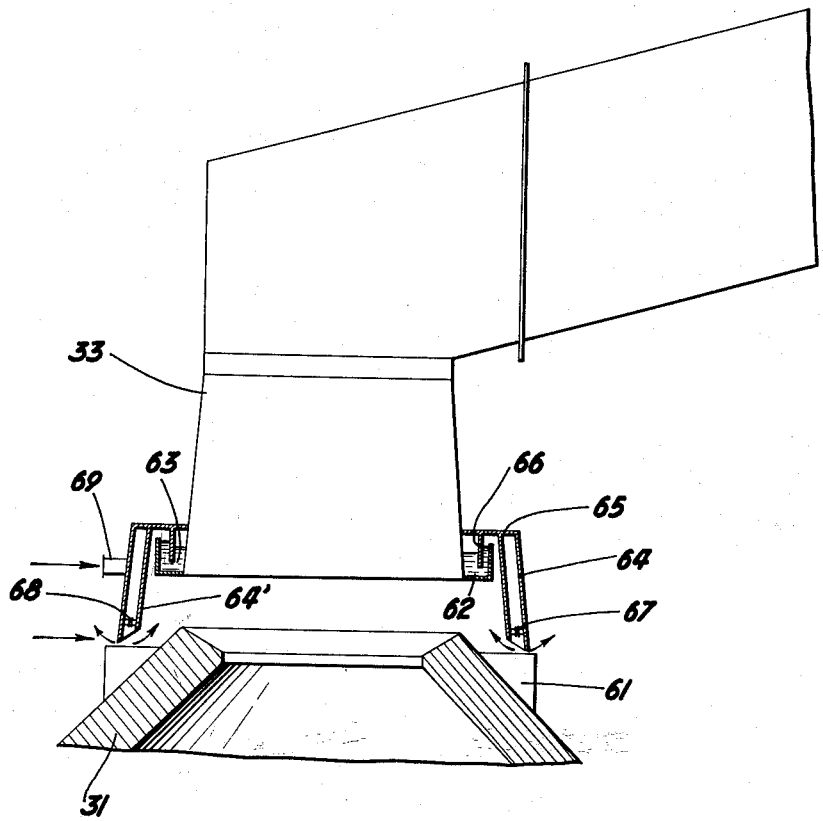

FIGS. 11 and 12 respectively illustrate a detail view of a mechanical latching system for a seal of a movable hood section, and a hood equipped with such a latching system;

FIG. 13 illustrates another form of movable seal; and

Figure 14:
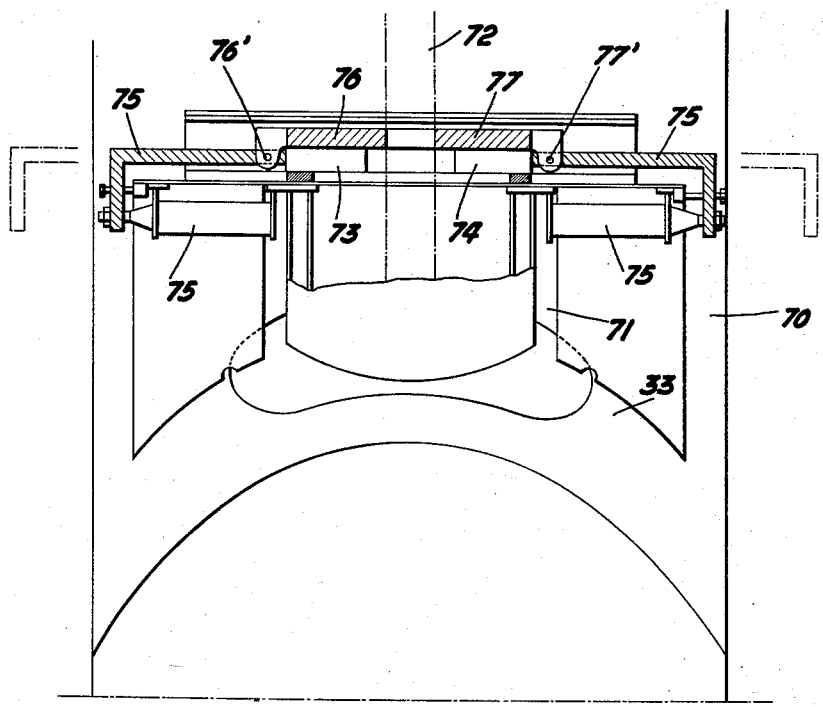
Figure 15:
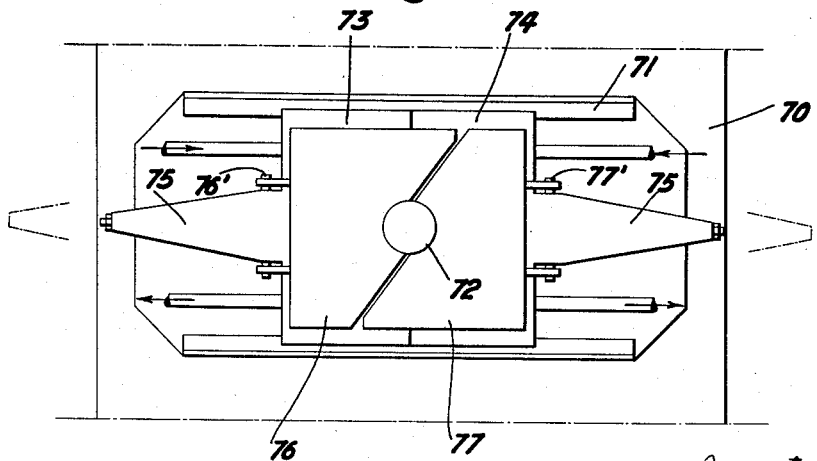

FIGS. 14 and 15 illustrate in vertical section and plan respectively a seal fitted on a hood for an oxygen blast pipe.

Figure 1:
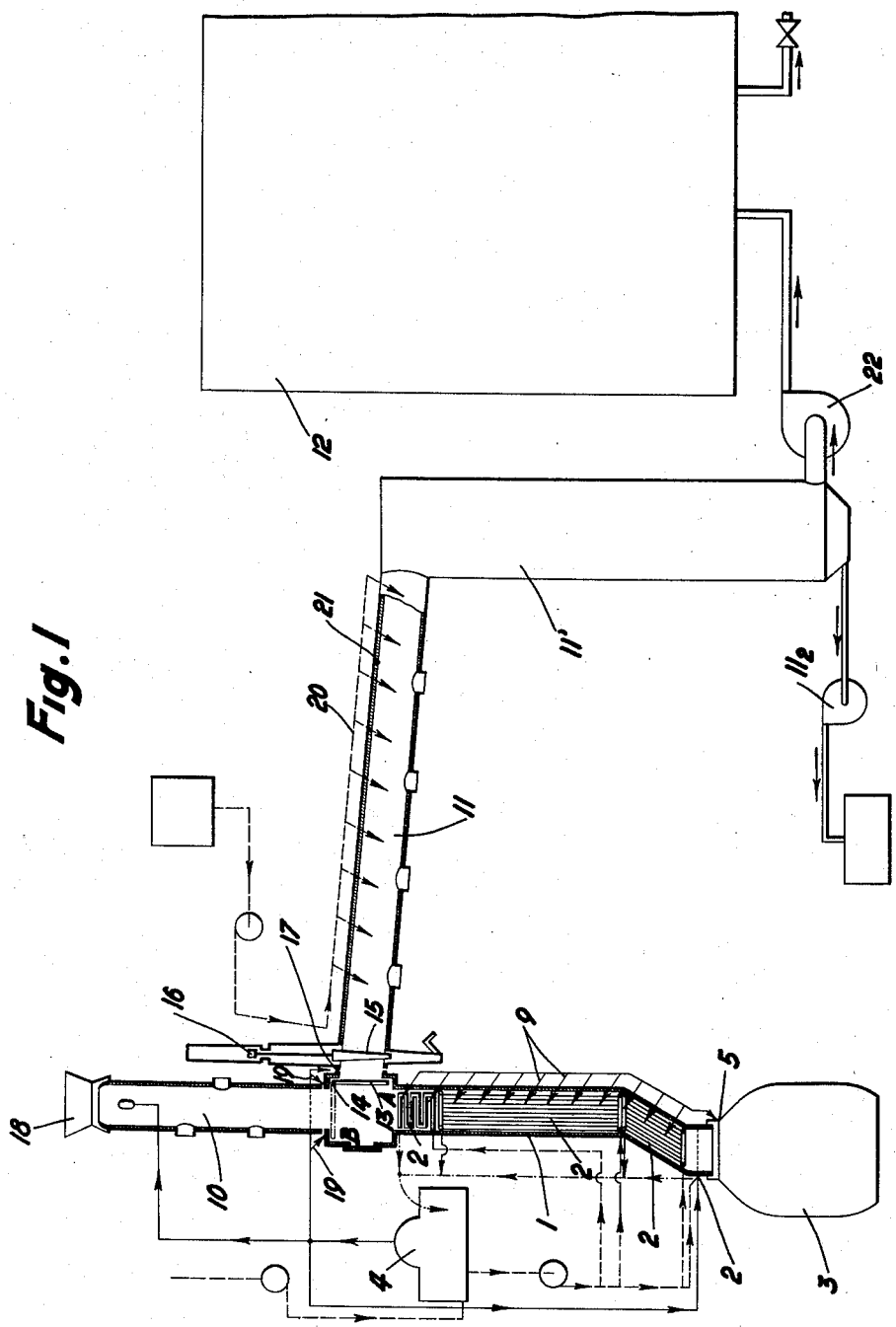
FIG. 1 is a schematic sectional diagram of a converter gas treating plant according to the invention.

Referring to FIG. 1, the system showing comprises a hood 1 connecting with the top outlet or snout of a conventional converter 3 so as to receive the exhaust gases therefrom. The hood 1 is provided with a water-jacket arrangement comprising the water tubes 2. The inlet and outlet into and from the water jacket are connected with a spherical collector vessel 4, so that a mixture of water and steam as produced in the water-jacket by the heat from the gases is delivered to collector 4; there the steam separtes from the water. It is noted that in FIG. 1 the steam piping is shown as thin lines with arrows indicating the sense of flow; water conduits are indicated as broken lines, while piping normally carrying a mixture of water and steam is indicated in chain dotted lines.

Between the top of converter 3 and the lower end of hood 1 a movable seal 5 is interposed and means, not illustrated, are provided for operating the seal from a remote point. One type of seal suitable for use as the seal 5 is illustrated in detail in FIG. 2 as comprising an annular chamber 6 into which steam is supplied, and which chamber rests freely upon the converter snout here designated by $3_1$. Spaced orifices 7 are provided for injecting the steam into expansion chambers 8 provided between the seal and the converter, and between the seal and the stationary hood 1. By such steam injection, the ingress of air is positively prevented. Steam may further be injected into the hood 1 by way of inlets 9, thereby cleaning the water tubes.

The gases issue from the hood at a temperature not higher than about 900° C., the flow rate of water through the jacket being so regulated, in correlation with the dimensioning of the hood, that such temperature is not exceeded. Means are provided for discharging the gases from the top of hood 1 selectively to a stack 10 provided with a steam ejector nozzle for discharge to atmosphere, and/or to the cleaning or scrubber unit 11 and storage 12. For this purpose a valve gate 13 is provided, suitable cooling means not shown being preferably associated with said gate. The valve gate 13 is pivoted at 14 so as to assume either of two positions, position A shown in full lines in which the gas flow is discharged to the drain and flue 10, and chain-line position B in which the gas is passed to the scrubber, recovery and storage equipment. A gate 15, provided with suitable cooling means and actuated by way of a piston 16, serves to isolate the latter section of the system when desired. Steam may be injected at 17 for sealing purposes.

A burner 18 e.g. of the type used with blast furnace gas, is provided for safe and convenient starting and stopping operations, and provides in addition a safety relief. The stack 10 is automatically filled with a jet of steam injected at 19 as soon as the recovery circuit is put into use. Auxiliary heating means, not shown, and using electric igniters for example, may be provided for starting the system.

Water is injected at 20 into the conduit 21 leading to the scrubber or de-duster unit 11, to complete the cooling of the gases. A wet scrubber $11_1$ of conventional type cleans the gases to a dust content under about 100 mg. per cu. m.

A variable speed blower 22 serves to discharge the gas to the gasometer or storage unit 12. The blower 22 is so regulated as to maintain a constant degree of suction in the hood, and is automatically stopped at the end of an oxygen-blasting operation. The valves 13 and 15 are operated in an automatic sequence, so that the pressure within the gas storage tank 12 applies the valve 15 against its seat. At the end of the operation, the gas returns to the stack 10 (now filled with steam) and, as the oxygen blast is stopped, the entire circuit is abundantly flushed out with steam. Sludge collects at the bottom of the wet scrubber $11_1$ and may be discharged therefrom by a sludge pump $11_2$.

The general operation of the system may be summarized as follows: Before an oxygen blast is initiated in the converter, the stack is filled with steam, it being noted that in starting up the system, such steam may be generated in collector 4 by an auxiliary heating device and stored therein.

When smoke first appears at the top of the stack 10, the blower 22 is started and the valve 15 is opened, while valve 13 is moved to the position shown at B. The flow circuit is thus switched to the scrubbing and storage section of the system in a smooth manner. Steam is injected into the upper part of stack 10 throughout the converter blasting operation.

When the oxygen blast is stopped, the valve 13 is returned from position B to position A, preferably by the action of automatic control means. The blower 22 is stopped, and valve 15 is closed. Steam is injected between valve 13 (in position A) and valve 15 (closed) as a safety measure. The venturi serves to drain the stack 10 at the same time as steam is injected at 9 and 19 to prevent post-combustion.

Figure 6:
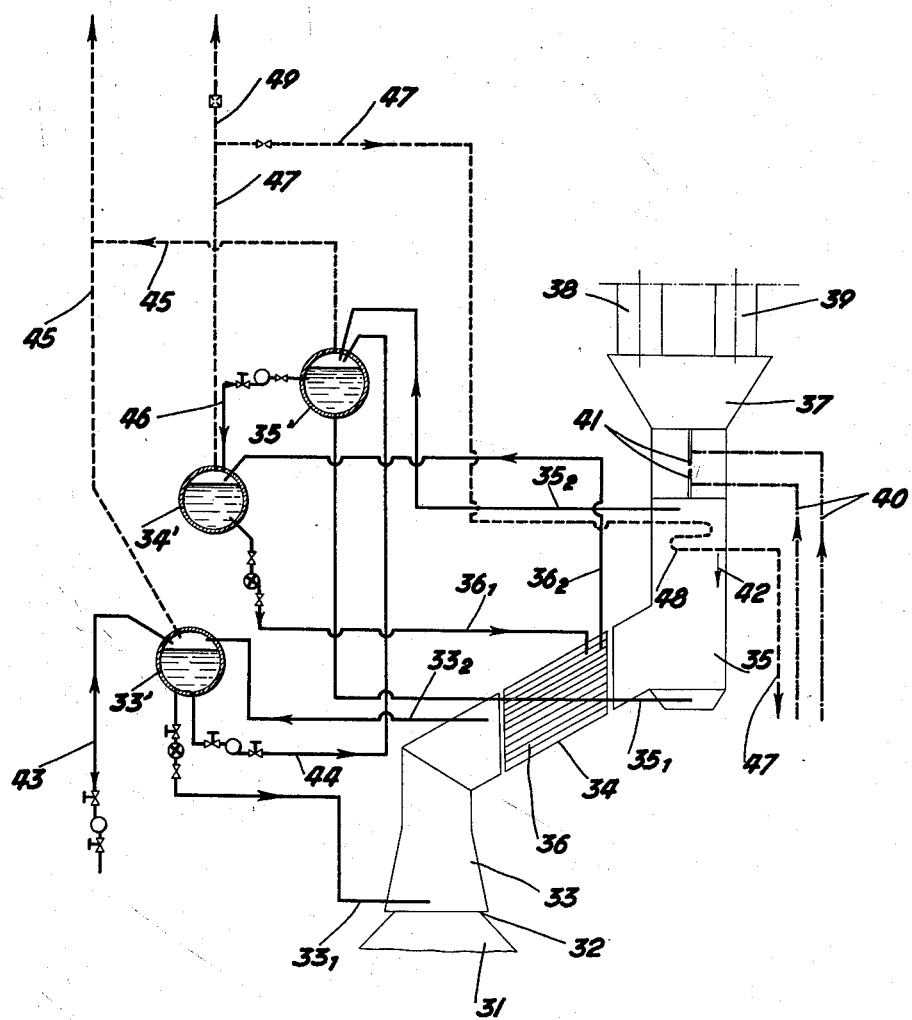
FIG. 6 is a schematic diagram showing a modified form of the converter gas collecting arrangement in a system according to the invention.

In the modified construction shown in FIG. 6, the top or snout of a converter is shown at 31. Applied over said snout by way of a suitable annular seal 32 is the vertical lower section 33 of a gas discharge collector or hood which further includes a mid-section 34 and an upper section 35. The lower and upper hood sections 33 and 35 are each provided with a water-jacket, the water flow therethrough being schematically indicated as entering at $33_1$ and $35_1$ respectively, and issuing at $33_2$ and $35_2$ respectively. The middle hood section 34 comprises a nest of tubes 36 forming a screen against radiated heat and including the water inlet $36_1$ and outlet $36_2$ into and out of the tube nest. The upper hood section 35 constitutes a vertical stack section terminating at its upper end in a valve box 37 through which the gases may be selectively directed through a stack 38 to the outer atmosphere or other disposal, and/or through a conduit 39 to a scrubbing and heat recovery system. The upper part of hood section 35 contains a water sprayer 41 to which water may be delivered by way of a line 40 to cool the flue gases. Advantageously the supply of water through line 40 to the sprayer is automatically controlled in accordance with the gas temperature as sensed by a temperature probe 42 by way of a conventional thermostat-controlled valve, not shown, positioned in line 40.

The water inlet $33_1$ and outlet $33_2$ are connected in a flow circuit including a spherical container 33'; and water inlet $35_1$ and outlet $35_2$ are similarly connected in a flow circuit including spherical container 35'. Make-up water is supplied to the former circuit by way of a line 43 connected with container 33'. The bottom of lower tank 33' and the top of upper tank 35' are interconnected by a line 44 whereby water from tank 33' may be delivered to tank 35'. The tops of the tanks 33' and 35' are vented to atmosphere by way of a common vent line 45.

Further, the water outlet $36_2$ and inlet $36_1$ associated with the intermediate hood section 34 are connected in a circuit including the intermediate spherical tank or container 34'. The top of tank 34' is connected with overhead tank 35' by way of a water line 46. The top of tank 34' is further connected with a steam line 47 which includes a superheater coil section 48 installed within the upper hood section 35 and adapted to discharge superheated pressure steam generated in said coil to any of various points of use, not shown. Thus the steam thus produced may be delivered to the interior of converter seal 32 as well as to the valve box 37, ejector nozzles and other ancillary equipment. Excess steam from tank 34' is vented through vent line 49 branching off from steam line 47.

In the modification shown in FIGS. 3 and 4, the lower hood section $1_1$ is slidably mounted in the hood section $1_2$ connecting therewith. Means, such as a hydraulic actuator not shown, are provided for imparting to the lower hood section $1_1$ desired vertical displacements. With the converter being in blasting position, vertical displacement of the lower hood section $1_1$ makes it possible to reduce the clearance present between the snout of the converter and the hood section to a very small value. Thus the suction within the hood is adjustable in operation to a very low value as desired, by acting on the inner flow resistance of the gas circuit. Desirably at least the lower hood section $1_1$ may be provided with a water jacket comprising the double casing $1_2'$. In such case, a movable seal, generally designated 5, is interposed between the converter 3 and the lower hood section $1_1$. As shown in FIGURE 5, the seal 5 may comprise an annular chamber 6 supplied with steam and resting by gravity upon a supporting member 6' of appropriate shape positioned on the outer wall of the converter snout. The movable hood section at its lower end and the corresponding part $5_1$ of the seal 5 are so shaped that any displacement imparted to the hood section will carry with it the seal part $5_1$. Means are provided however for raising the seal 5 independently of any displacement imparted to the hood.

The arrangement described makes possible direct monitoring and measurement of the physical phenomena occurring during the blasting process. Moreover, it provides a means of preventing the abhesion that may tend to occur as between the converter snout, the hood and the intervening seal, in case of abnormal blasting and resulting "foaming" of the slag. The cooperating parts of the hood and seal are so dimensioned and conformed as to provide for freedom of relative and/or bodily displacements of the hood and the seal.

The desired fluid-tightness is provided by the simple hydraulic seal shown in FIGURE 5 and already described. Alternatively, it can be provided by other means. Thus any ingress of air can be practically averted provided the suction within the hood is also properly adjusted.

In the embodiment of the invention shown in FIGS. 7 and 8, the hood section 33-34 is provided rotatable about the vertical axis of the upper section 35; the connection between the rotatable hood portion and the stationary upper section 35 is provided by way of a rotary hydraulic seal 50 of any suitable type, preferably provided with automatic refill means for maintaining a constant water level therein. The hood section 34 rests by way of a roller-cradle 51 upon an annular track 52 which allows of the hood being disengaged from the converter 31, as indicated in chain lines in FIG. 8. The hood is retained in either of its two positions, the operative and the disengaged, by any suitable blocking means not shown.

In the construction shown in FIG. 9, the hood is arranged for rocking movement about an horizontal axis 55, and for this purpose is mounted on a rocking cradle or frame 54. Thus the hood may be rocked so as simultaneously to disengage the hood section 33 from the converter 31 and the hood section 34 from the stationary upper section 35, the separation between the latter two sections being effected at seal 50. This may again be an automatic-refill, constant level, type of hydraulic seal, or it may be a quick-latching mechanical seal of a type later described.

According to FIG. 10, the hood section assembly 33-34 is vertically displaceable for separation thereof from the converter 31; the disengaged position of this hood assembly is shown in chain lines.

It will be understood that any suitable manual or power actuator means of mechanical, pneumatic, hydraulic or electric types may be provided for operating the movable portions of the equipment in the constructions of any of FIGS. 7 to 10. The disengagement of the hood may be effected along any cross section of the gas discharge tubing by means of an overhead travelling crane of conventional type.

FIGS. 11 and 12 illustrate an arrangement according to the invention including a quick-latching mechanically retractible seal for connecting the removable hood section 33 to the stationary section 34. The seal is shown on an enlarged scale in FIG. 11. Mounted on the hood section 34 is at least one assembly comprising a yielding member 54 held between a stationary upright 55 and a movable upright 56 displaceable by means of pressure-fluid actuators 57 for compressing the member 54. Yokes 58 have their one ends pivoted at the movable upright 56 and are engageable with a flange 59 of the hood section 33 by means of screws or other clamping means. The hood is retained in its operative position by means of a rigid supporting frame 60 secured thereto through pins or the like as shown at 60'.

FIG. 13 illustrates one construction of the movable seal 32 between the hood and the converter snout. Welded around the snout is an annular flange 61. The lower hood section 33 carries at its lower end an annular trough 62 containing a body of water 63 maintained at a constant level, through conventional means not shown. Secured around the hood section 33 above the trough 62 is a downwardly open sleeve member defining an annular chamber and including the spaced, coaxial annular walls 64 and 64' interconnected at their top by the horizontal flange 65 secured to the hood section. An inner annular wall 66 depending from the top flange 65 dips into the water in trough 62. The spaced annular outer walls 64 and 64' are interconnected near their lower ends by an annular horizontal wall 67 formed with outlet orifices 68.

The inner wall 64' of the spaced annular walls is preferably provided somewhat shorter than the outer wall 64, as shown. Superheated steam under relatively high pressure delivered from steam line 47 mentioned previously is discharged through an inlet 69 into the upper part of the annular chamber defined by flange 65, annular walls 64, 64' and bottom wall 67. This steam expands through the outlets 68 so that at the open lower end of the annular chamber its pressure is only slightly higher than atmospheric. This annular sheet of steam is then discharged through the annular space between wall 64 and converter 31, and thence into the interior of the hood.

FIGS. 14 and 15 illustrate an improved form of seal preferably provided according to the invention around the oxygen blast nozzle. Such seal is visible in FIGS. 7, 9 and 10 and 12 where it is generally designated 53. As shown in FIGS. 14 and 15, the hood 33 carries a frame structure 70 and an inner casing 71 in which an oxygen blast nozzle 72 is vertically displaceable. Mounted on top of the frame 70 and casing 71 are a pair of horizontal slides 73 and 74 formed with arcuate recesses around the vertical axis of the casing, so as to cover a major portion of the free area through which nozzle 72 is passed, while providing around said nozzle, in the closed position of the slide gates, a moderate clearance of about an inch or so serving to permit the passage of slag that may adhere to the sides of the oxygen nozzle. Conventional means, such as water jacketing not shown, are provided for cooling the slide-gates. The slide gates are connected for simultaneous displacement in opposite directions towards and away from each other by means of jacks and linkages as shown at 75. Flaps 76, 77 pivoted on pivots 76'-77' on the slides 73 and 74 respectively are engageable with the upper surfaces of the slides. The flaps are so dimensioned that they may be made closely to engage around oxygen pipe 72, whereby they will exert a scraping action to remove projected slag adhering to said pipe whenever the pipe is operated during a conversion process. Should the slag be bonded too firmly to the pipe surface to be scraped off, the flaps 76 and 77 will lift as the pipe is raised and will drop back into position after the obstruction has moved past.

When it is desired to replace the oxygen pipe, the slides 73 and 74 are opened wide so as to leave a large opening in the hood 33. The flaps are so contoured, as shown in FIG. 15 that their shape aids in centering the pipe 72 on closure of the slides 73 and 74.

Important advantages result from the cascade or series arrangement of the spherical water tanks and the steam take-off connections, whereby the rate of steam output is increased without additional cost, from the insertion, in the vicinity of the outlet of the downstream section, of a thermostat which controls a spraying of cooling water upstream of the outlet stack, for controlling the temperature of the gases as a function of the thermal load of the installation, and furthermore from the provisions for removal of the hood, which eliminate prolonged and costly shutdowns. The provision of the improved sealing means described and using superheated steam under pressure also substantially enchances the economy of the system.

The improvements provided by this invention further facilitate a direct supervision of the converter and analysis of the gases since sampling of gases in the converter and hood can easily be effected. Thus the converting operations can be conveniently monitored and accurately controlled, as by comparing the data derived from such direct supervision with standard data sheets or graphs provided in advance.

Thus, a conventional calorigraph device is provided for recording the heat capacity of the gases and automatically controlling in accordance therewith the opening and closure movements of the valve controlling discharge of the gases to the gasometer or other gas storage, as by opening said valve when the gas has attained a predetermined minimum value of heat capacity.

It has been found that a system constructed in accordance with the invention makes it possible to accumulate the converter exhaust gases at rates and in amounts considerably greater than those that could be achieved by any of the conventional systems used for this purpose, and thus to retrieve considerably greater amounts of energy. The rich gas may be used at any points of the plant of which the system forms part. It may be discharged to a blast-furnace gas network, especially in plants that operate on very lean grades of gas and without coking furnaces.

The space requirements of the system are considerably reduced with respect to conventional boiler-and-deduster systems and the costs are correspondingly less. The power consumption required for draft purposes is comparatively low. Moreover the degree of dedusting of the gases need not be as thorough as was necessary in prior installations owing to the relatively large dilution of the converter gases in another combustible gas.

In the improved system the rate of flow and composition of the converter gases are very easily determined since the gases are picked off at the outlet from the converter and no additional gases external to the steel process itself are admixed therewith. The flow determination may be made by the use of conventional flowmeters interposed in the flowpath of the scrubbed gases. The gas composition may be analyzed, especially in regard to carbon monoxide and carbon dioxide content, by the usual techniques. The measures specified, which are made possible only in view of the direct collection of the converter gases by the system of the invention, will make it possible to monitor more accurately than was heretofore possible the operating conditions of a steelmaking process without interrupting the process, and consequently to determine with a higher degree of precision the point at which the process must be stopped in order to achieve a desired steel composition.

In view of the reducing, or very slightly oxidizing, character of the medium in which the gases are dedusted in the system of the invention, the gases contain no or very little free oxygen (less than about 2%). This advantageously modifies the character of the dust suspended therein.

What I claim is:

1. In a system for processing converter exhaust gases to recover heat energy therefrom and to reduce the dust content and the volume of said exhaust gases, a converter having a top outlet for exhaust gases; a hood connected with said outlet for receiving and discharging the exhaust gases issuing from said top outlet; seal means at the connection of said converter to said hood; steam boiler means including water tubes associated with said hood in heat exchanging relation with said gases; a collector vessel; means for conducting water in a circuit from said collector vessel through said tubes for generation of steam therein and conducting water mixed with steam back to said collector vessel for collection of water and steam in said collector vessel; stack means connected to said hood, said stack means and said hood forming a first exhaust gas flow path; means, including dust extraction means for receiving and cleaning the gases directed thereto, for forming a second exhaust gas flow path associated with said first path; valve means for alternatively opening and closing said first path and said second path; gas storage means for receiving gases from said dust extraction means; and means for delivering steam from said collector vessel to at least one of said two gas paths.

2. A system according to claim 1 wherein said hood comprises a lower section, an intermediate section and an upper section, water jackets associated respectively with said lower and upper sections, the water tubes being associated with the intermediate section for the production of pressure steam; and including a first and a second collector tank connected respectively in circuit with the outlet and inlet of each of said water jackets, and means for venting steam from each of said collector tanks to atmosphere.

3. A system according to claim 2, which includes a feed water circuit connected with said tanks and said collector vessel in cascade so that all of the feed water is passed to said collector tanks and collector vessel in sequence.

4. A system according to claim 2, wherein the lower hood section is movable for engagement with and disengagement from said converter top outlet.

5. A system according to claim 4 wherein the lower hood section is movable, and a retractable sealing device is interposed between said movable hood section and said intermediate hood section.

6. A system according to claim 1 including means for passing an oxygen blast nozzle into the converter through said hood in sealing relationship with said hood.

7. A system according to claim 6, wherein said means comprise oppositely slidable gates formed to provide a clearance about said blast nozzle, and a pair of flaps pivoted to the upper surfaces of said gates so as to be movable between a closing position in which the gates engage the side surface of said nozzle, and an open position.

8. The system of claim 1, including further valve means in said second path for opening and closing said second path.

9. The system of claim 8, wherein said steam delivering means includes means for injecting the steam delivered from said collector vessel into said second path at a point between said valve means and said further valve means when both said valve means close the second path.

10. The system of claim 8, in which said steam delivering means includes means for injecting the steam delivered from said collector vessel into said stack means.

11. The system of claim 9, including a variable speed blower means connected between said dust extraction means and said gas storage means and operated when said first path is closed.

12. A system according to claim 1, wherein said hood comprises a lower section, an intermediate section, and an upper section, said lower section being movable for engagement with and disengagement from said converter top outlet, water jackets associated with said lower and upper sections, the water tubes being associated with the intermediate section for the production of pressure steam; wherein said system further includes a first and a second collector tank connected respectively in circuit with the outlet and the inlet of each of said water jackets, and means for venting steam from each of said collector tanks to atmosphere; wherein said seal means is movable with and independently of said lower hood section; and wherein said steam delivering means includes means for injecting the steam delivered from said collector vessel into said seal means.

13. A system according to claim 1, wherein said hood comprises a lower section, an intermediate section, and an upper section, said lower section being movable for engagement with and disengagement from said converter top outlet, water jackets associated with said lower and upper sections, the water tubes being associated with the intermediate section for the production of pressure steam; wherein said system further includes a first and a second collector tank connected respectively in circuit with the outlet and the inlet of each of said water jackets, and means for venting steam from each of said collector tanks to atmosphere; and wherein said seal means comprises means for defining an annular chamber surrounding the lower hood section, said chamber defining means being movable with and independently of the lower hood section, said means for delivering steam including a superheater mounted in the upper hood section and connected with said collector vessel for superheating the steam therefrom, means for delivering superheated steam from said superheater into an upper part of said annular chamber, and expansion outlets for discharging the superheated steam from the lower part of said annular chamber into the interior of the hood and at superatmospheric pressure.

14. A system according to claim 1, wherein said hood comprises a lower section, an intermediate section, and an upper section, said lower section being movable for engagement with and disengagement from said converter top outlet, water jackets associated with said lower and upper sections, the water tubes being associated with the intermediate section for the production of pressure steam; wherein said system further includes a first and a second collector tank connected respectively in circuit with the outlet and the inlet of each of said water jackets, and means for venting steam from each of said collector tanks to atmosphere; wherein said seal means comprises an hydraulic seal structure which is movable with and independently of said lower hood section, said hydraulic seal structure having means for automatically maintaining a constant water level in the seal structure; and wherein said steam delivering means includes means for injecting the steam delivered from said collector vessel into said hydraulic seal structure.

15. In a system for processing converter exhaust gases to recover heat energy therefrom and to reduce the dust content and the volume of said exhaust gases, a converter having a top outlet for exhaust gases; a hood connected with said top outlet for receiving and discharging the exhaust gases issuing from the top outlet; seal means for sealing the connection between said converter and said hood; steam boiler means including water tubes associated with said hood and disposed in heat exchanging relation with said exhaust gases to generate steam therein while simultaneously cooling said exhaust gases; a collector vessel; flow circuit means for conducting water in a circuit from said collector vessel through said tubes for the generation of steam therein and conducting water and steam back to said collector vessel for collection of the water and steam in said collector vessel; stack means connected to said hood, said stack means and said hood forming a first exhaust gas flow path; means, including dust extraction means for receiving and cleaning the gases directed thereto, for forming a second exhaust gas flow path intersecting said first path; valve means located at the intersection of said paths for alternatively opening and closing said first path and said second path; gas storage means for receiving cleaned gases from said dust extraction means; and means for delivering steam from said collector vessel to at least one location of at least one of said gas flow paths.

16. In a system for processing converter exhaust gases to recover the latent and sensible heat energy content thereof and to reduce the dust content and the volume of said exhaust gases, a converter having a top outlet for exhaust gases; a hood connected with said outlet for receiving and discharging the exhaust gases issuing from the top outlet; seal means for sealing the connection between said converter and said hood; steam boiler means including water tubes mounted upon said hood in heat exchanging relation with said exhaust gases to generate steam therein while simultaneously cooling said exhaust gsaes; a collector vessel; means for conducting water in a circuit from said collector vessel through said tubes for the generation of steam therein and conducting water and steam back to said collector vessel for collection of the water and steam in said collector vessel; stack means communicating with said hood; dust extraction means for receiving and cleaning the gases directed thereto; conduit means for providing communication between said dust extraction means and said hood; valve means positioned to direct the exhaust gases from said hood alternatively into said stack means or into said conduit means; gas storage means for receiving cleaned gases from said dust extraction means; and means for delivering steam from said collector vessel for injection into at least one of the following, namely: said seal means; said stack means; and said conduit means.

References Cited by the Examiner
UNITED STATES PATENTS

| | | | |
|---|---|---|---|
| 1,866,824 | 7/32 | Sheridan | 266—35 |
| 2,195,274 | 3/40 | Ferguson | 122—7 |
| 2,354,400 | 7/44 | Percy. | |
| 2,621,300 | 12/52 | King. | |
| 2,702,026 | 2/55 | Dalin. | |
| 2,803,450 | 8/57 | McFeaters | 266—35 X |
| 2,803,987 | 8/57 | Galey. | |
| 2,954,244 | 9/60 | Austin | 266—35 |

FOREIGN PATENTS

| | | |
|---|---|---|
| 571,016 | 12/57 | Italy. |
| 571,018 | 12/57 | Italy. |

OTHER REFERENCES

The Making, Shaping and Treating of Steel, page 114, 7th edition, 1957.

MORRIS O. WOLK, *Primary Examiner.*

HERBERT L. MARTIN, RAY K. WINDHAM,
*Examiners.*